United States Patent
Schulte et al.

(10) Patent No.: US 11,243,134 B2
(45) Date of Patent: Feb. 8, 2022

(54) PRESSURE SENSING DEVICE ISOLATION CAVITY SEAL MONITORING

(71) Applicant: Rosemount Inc., Shakopee, MN (US)

(72) Inventors: John Paul Schulte, Eden Prairie, MN (US); Eugene Korolev, Maple Grove, MN (US)

(73) Assignee: ROSEMOUNT INC., Shakopee, MN (US)

( * ) Notice: Subject to any disclaimer, the term of this patent is extended or adjusted under 35 U.S.C. 154(b) by 185 days.

(21) Appl. No.: 16/588,489

(22) Filed: Sep. 30, 2019

(65) Prior Publication Data

US 2021/0096036 A1   Apr. 1, 2021

(51) Int. Cl.
*G01L 27/00* (2006.01)
*G01L 9/00* (2006.01)
(Continued)

(52) U.S. Cl.
CPC ............ *G01L 27/007* (2013.01); *G01L 9/007* (2013.01); *G01L 11/00* (2013.01); *G01L 13/026* (2013.01);
(Continued)

(58) Field of Classification Search
CPC ..... G01L 9/00–12; G01L 9/007; G01L 11/00; G01L 13/00–02; G01L 13/026; G01L 19/00–06; G01L 19/0092; G01L 19/0645; G01L 27/00; G01L 27/007; G01M 3/02; G01M 7/00
See application file for complete search history.

(56) References Cited

U.S. PATENT DOCUMENTS 4,169,389 A * 10/1979 Yasuhara ............... G01L 9/0072
                                                      361/283.4
5,094,109 A    3/1992 Dean et al.
(Continued)

FOREIGN PATENT DOCUMENTS

GB          2 433 298       6/2007
WO     WO 2012/098136       7/2012

OTHER PUBLICATIONS

International Search Report and Written Opinion of the International Searching Authority from International Application No. PCT/US2020/033123, dated Aug. 26, 2020.

*Primary Examiner* — Nguyen Q. Ha
(74) *Attorney, Agent, or Firm* — Westman, Champlin & Koehler, P.A.

(57) ABSTRACT

An industrial process differential pressure sensing device includes a housing having first and second isolation cavities that are respectively sealed by first and second diaphragms, a differential pressure sensor, a static pressure sensor, an eddy current displacement sensor, and a controller. The static pressure sensor is configured to output a static pressure signal that is based on a pressure of fill fluid in the first isolation cavity. The differential pressure sensor is configured to output a differential pressure signal that is indicative a pressure difference between the first and second isolation cavities. The eddy current displacement sensor is configured to output a position signal that is indicative of a position of the first isolation diaphragm relative to the housing. The controller is configured to detect a loss of a seal of the isolation cavity based on the position signal, the static pressure signal and the differential pressure signal.

19 Claims, 8 Drawing Sheets

(51) Int. Cl.
  *G01L 11/00* (2006.01)
  *G01L 13/02* (2006.01)
  *G01L 19/00* (2006.01)
  *G01L 19/06* (2006.01)
  *G01M 3/02* (2006.01)
(52) U.S. Cl.
  CPC ...... *G01L 19/0092* (2013.01); *G01L 19/0645* (2013.01); *G01M 3/02* (2013.01)

(56) References Cited

U.S. PATENT DOCUMENTS

| | | |
|---|---|---|
| 5,760,310 A | 6/1998 | Rud, Jr. et al. |
| 5,798,462 A | 8/1998 | Briefer et al. |
| 7,295,131 B2 | 11/2007 | Anderson et al. |
| 2018/0180504 A1 | 6/2018 | Uehlin et al. |

* cited by examiner

PRESSURE SENSING DEVICE ISOLATION CAVITY SEAL MONITORING

FIELD

Embodiments of the present disclosure relate to isolation arrangements for industrial process pressure sensing devices and, more specifically, to techniques for monitoring an isolation cavity for a seal breach.

BACKGROUND

Industrial process pressure sensing devices, such as pressure transmitters and flow measurement devices, are used in industrial process control systems to monitor pressures of process media using a pressure sensor that provides an output in response to process media pressures. One well known type of pressure transmitter is the Model 3051 transmitter available from Rosemount Inc. of Chanhassen, Minn. Pressure transmitters are also shown in U.S. Pat. No. 5,094,109, for example.

Exposure of the pressure sensor to the process medium can damage the process sensor and adversely affect pressure measurements. An isolation arrangement is used to separate the pressure sensor from the process medium while allowing the pressure sensor to detect the pressure of the process medium. The isolation arrangement typically includes an isolation diaphragm that is exposed to the process medium. The isolation diaphragm is typically a very thin and compliant member that flexes in response to the pressure of the process medium. The flexing of the isolation diaphragm, which represents the pressure of the process medium, is coupled to the pressure sensor through an isolation or fill fluid that is contained in an isolation cavity, such as a fluid line. Thus, the pressure sensor is able to measure the process pressure by measuring the pressure of the isolation fluid without being exposed to the process medium.

The seal of the isolation cavity may be breached due to a rupture of the isolation diaphragm from exposure to corrosive or abrasive process media or a seal failure, for example. The breach of the seal of the isolation cavity can result in an isolation fluid leak, which can lead to a degradation to pressure measurements. Additionally, the process medium may enter the isolation cavity, which can damage the pressure sensor due to the process fluid and further degrade pressure measurements.

SUMMARY

Embodiments of the present disclosure generally relate to an industrial process differential pressure sensing device, a method for detecting a loss of seal condition of an isolation cavity of an isolation arrangement in a differential pressure sensing device, and a differential pressure sensor isolation arrangement. One embodiment of the industrial process differential pressure sensing device includes a housing having first and second isolation cavities that are respectively sealed by first and second diaphragms, a differential pressure sensor, a static pressure sensor, an eddy current displacement sensor, and a controller. The static pressure sensor is configured to output a static pressure signal that is based on a pressure of fill fluid in the first isolation cavity. The differential pressure sensor is configured to output a differential pressure signal that is indicative a pressure difference between the first and second isolation cavities. The eddy current displacement sensor is configured to output a position signal that is indicative of a position of the first isolation diaphragm relative to the housing. The controller is configured to detect a loss of a seal of the isolation cavity based on the position signal, the static pressure signal and the differential pressure signal.

One embodiment of the method relates to an isolation arrangement in an industrial process differential pressure sensing device that includes a housing having first and second isolation cavities, a differential pressure sensor, a static pressure sensor, a first isolation diaphragm sealing a process interface of the first isolation cavity from an industrial process medium, and a second isolation diaphragm sealing a process interface of the second isolation cavity from the process medium. In the method, a position of the first isolation diaphragm relative to the housing is detected using a first eddy current displacement sensor. A static pressure of the fill fluid within the first isolation cavity is obtained using the static pressure sensor, and differential pressure between the first and second isolation cavities is obtained using the differential pressure sensor. An expected position of the first isolation diaphragm relative to the housing from memory is obtained based on the static pressure and the differential pressure using a controller. A loss of seal of the first isolation cavity is detected when a difference between the detected position of the first isolation diaphragm and the expected position of the first isolation diaphragm exceeds a threshold value. A notification is generated when the loss of seal is detected using the controller.

The differential pressure sensor isolation arrangement is configured to separate an industrial process medium from a differential pressure sensor. In one embodiment, the isolation arrangement includes a housing having first and second isolation cavities that are each exposed to the differential pressure sensor, a fill fluid contained in the isolation cavities, first and second isolation diaphragms, and an eddy current displacement sensor. The first isolation diaphragm is configured to seal the first isolation cavity at a process interface from the process medium. The second isolation diaphragm is configured to seal the second isolation cavity at a process interface from the process medium. The eddy current displacement sensor is configured to output a position signal that is indicative of a position of the first isolation diaphragm relative to the housing. The position signal indicates a condition of a seal of the first isolation cavity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
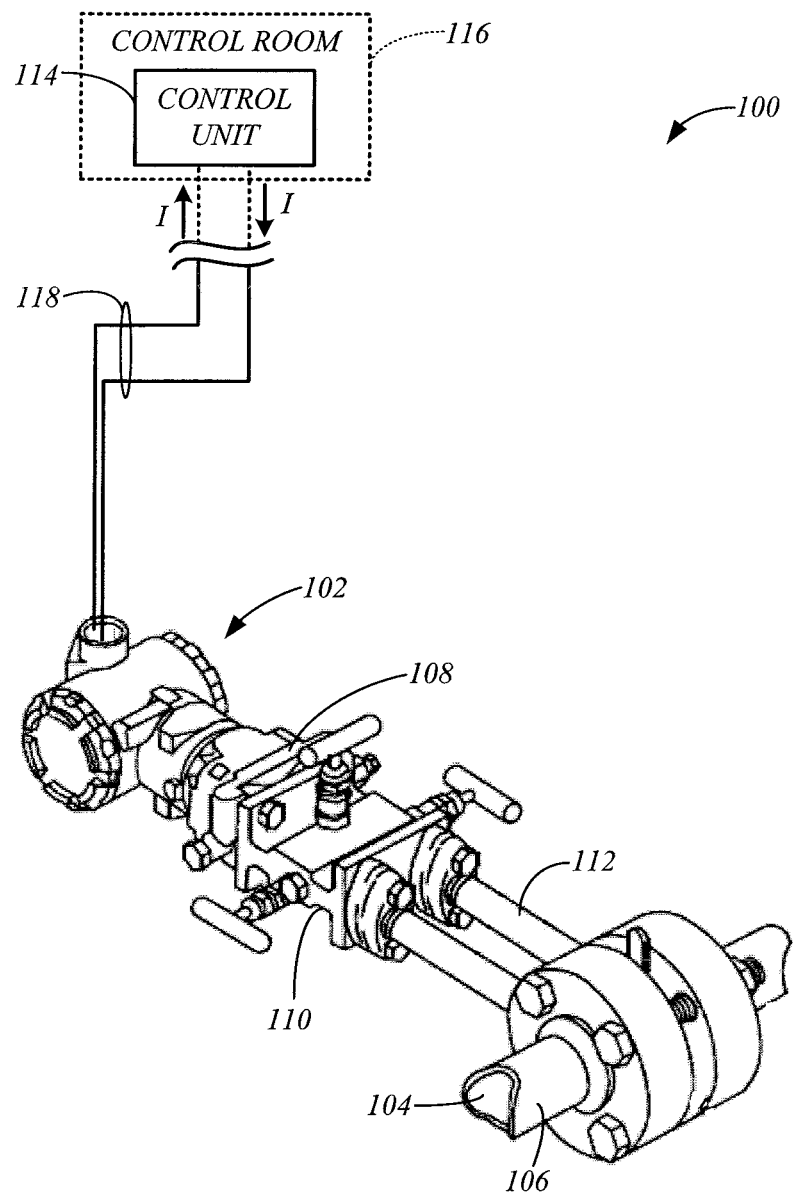
FIG. 1 is a simplified diagram of an exemplary industrial process measurement system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

FIG. 1 is a simplified diagram of an exemplary industrial process measurement system 100, in accordance with embodiments of the present disclosure. The system 100 may be used in the processing of a material to transform the material from a less valuable state into more valuable and useful products, such as petroleum, chemicals, paper, food, etc. For example, the system 100 may be used in an oil refinery that performs industrial processes that can process crude oil into gasoline, fuel oil, and other petrochemicals.

The system 100 includes a transmitter 102 that utilizes a pressure sensor to measure or sense a pressure (e.g., static or differential pressure) relating to a process medium 104. In some embodiments, the process medium 104 may be a fluid (i.e., liquid or gas) that is contained or transported through a process vessel 106, such as a pipe (shown), a tank, or another process vessel. The transmitter 102 may be coupled to the vessel 106 through an adapter 108, a manifold 110 and a process interface 112, for example.

The transmitter 102 may communicate process information with a computerized control unit 114. The control unit 114 may be remotely located from the transmitter 102, such as in a control room 116 for the system 100, as shown in FIG. 1. The process information may include, for example, a static pressure, a differential pressure or a related process parameter, such as a flow rate of a fluid flow through the vessel that is based on the differential pressure.

The control unit 114 may be communicatively coupled to the transmitter 102 over a suitable physical communication link, such as a two-wire control loop 118, or a wireless communication link. Communications between the control unit 114 and the transmitter 102 may be performed over the control loop 118 in accordance with conventional analog and/or digital communication protocols. In some embodiments, the control loop 118 includes a 4-20 milliamp control loop, in which a process variable may be represented by a level of a loop current I flowing through the control loop 118. Exemplary digital communication protocols include the modulation of digital signals onto the analog current level of the two-wire control loop 118, such as in accordance with the HART® communication standard. Other purely digital techniques may also be employed including FieldBus and Profibus communication protocols.

The transmitter 102 may also be configured to communicate wirelessly with the control unit 114 using a conventional wireless communication protocol. For example, the transmitter 102 may be configured to implement a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the transmitter 102 from any suitable power source. For example, the transmitter 102 may be wholly powered by the current I flowing through the control loop 118. One or more power supplies may also be utilized to power the transmitter 102, such as an internal or an external battery. An electrical power generator (e.g., solar panel, a wind power generator, etc.) may also be used to power the transmitter 102, or to charge a power supply used by the transmitter 102.

Figure 2:
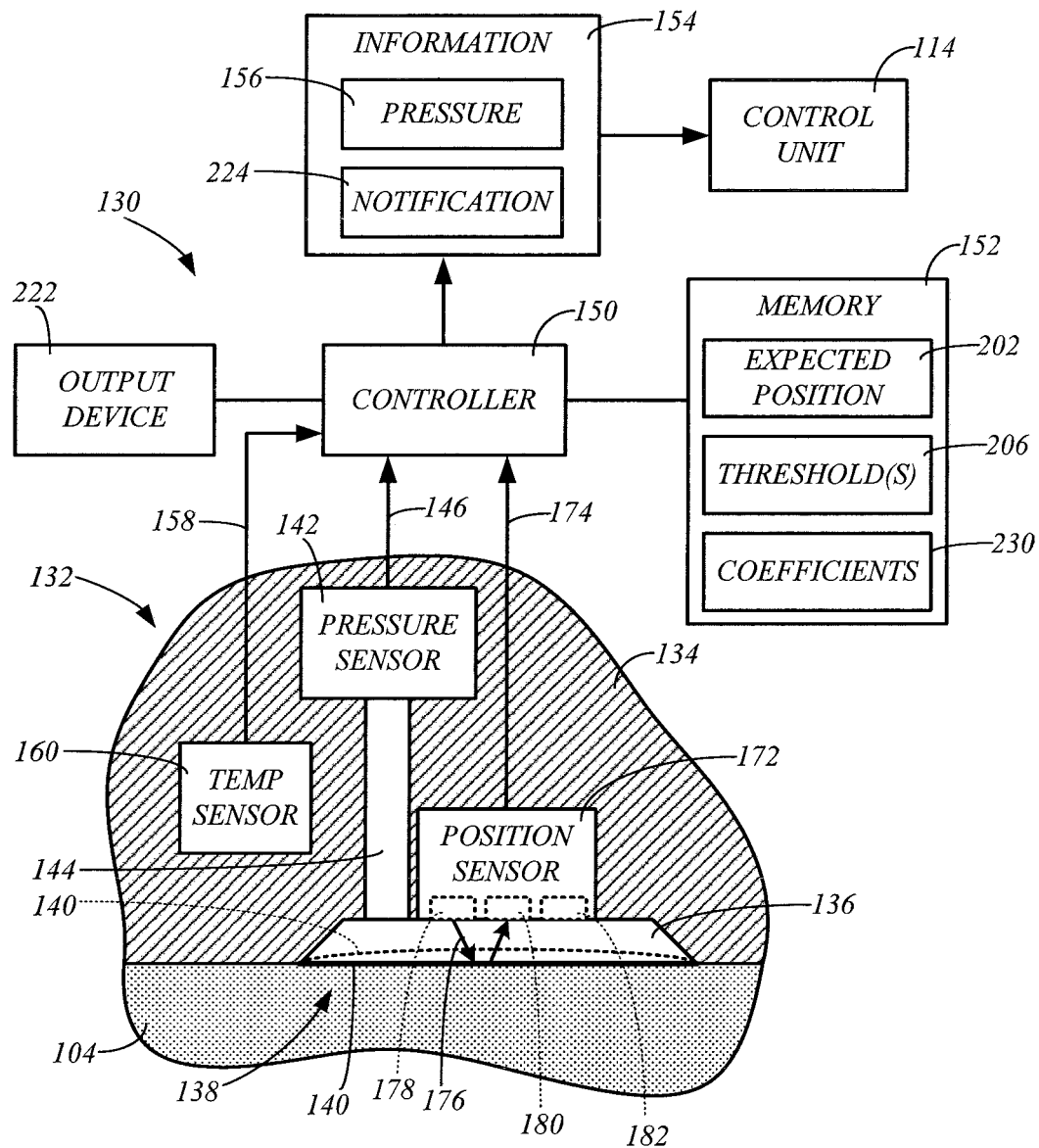
FIG. 2 is a simplified diagram of an exemplary industrial process pressure sensing device having an isolation arrangement, in accordance with embodiments of the present disclosure.

As discussed above, pressure sensors of industrial process pressure transmitters 102 may be coupled to the process medium 104 through an isolation arrangement to prevent exposure of the pressure sensor to the process medium. FIG. 2 is a simplified diagram of an exemplary industrial process pressure sensing device 130, such as a pressure transmitter, having an isolation arrangement 132 in accordance with embodiments of the present disclosure. The isolation arrangement 132 includes a housing 134 having an isolation cavity 136, which is sealed at a process interface 138 by an isolation diaphragm 140 that is exposed to the process medium 104. The isolation diaphragm 140 may be formed of metal (e.g., stainless steel) and flexes in response to the pressure of the process medium 104. The flexing of the isolation diaphragm 140, which represents the pressure of the process medium 104, is communicated to a pressure sensor 142 through an isolation fluid 144 (e.g., silicone oil, hydraulic fluid, etc.) that is contained in the cavity 136. The pressure sensor 142 may generate a pressure signal 146 that is indicative of the pressure (e.g., static pressure) of the isolation fluid 144 and the process medium 104.

In some embodiments, the device 130 includes a controller 150 (FIG. 2), which may represent one or more processors (i.e., microprocessor, central processing unit, etc.) that control components of the device 130 to perform one or more functions described herein in response to the execution of instructions, which may be stored locally in any suitable patent subject matter eligible computer readable media or memory 152 that does not include transitory waves or signals, such as, for example, hard disks, CD-ROMs, optical storage devices, or magnetic storage devices.

The processors of the controller 150 may be components of one or more computer-based systems. In some embodiments, the controller 150 includes one or more control circuits, microprocessor-based engine control systems, one or more programmable hardware components, such as a field programmable gate array (FPGA), that are used to control components of the device 130 to perform one or more functions described herein.

The controller 150 may also represent other device circuitry, such as communications circuitry that is configured to communicate information 154 to the control unit 114, in accordance with a conventional communications protocol.

The information may include pressure information 156 derived from the pressure signal 146. The pressure information 156 may also be based on a temperature signal 158 generated by a temperature sensor 160, which may be indicative of a temperature of housing 134, the fill fluid 144, and/or the process medium 104, for example.

Figure 3:
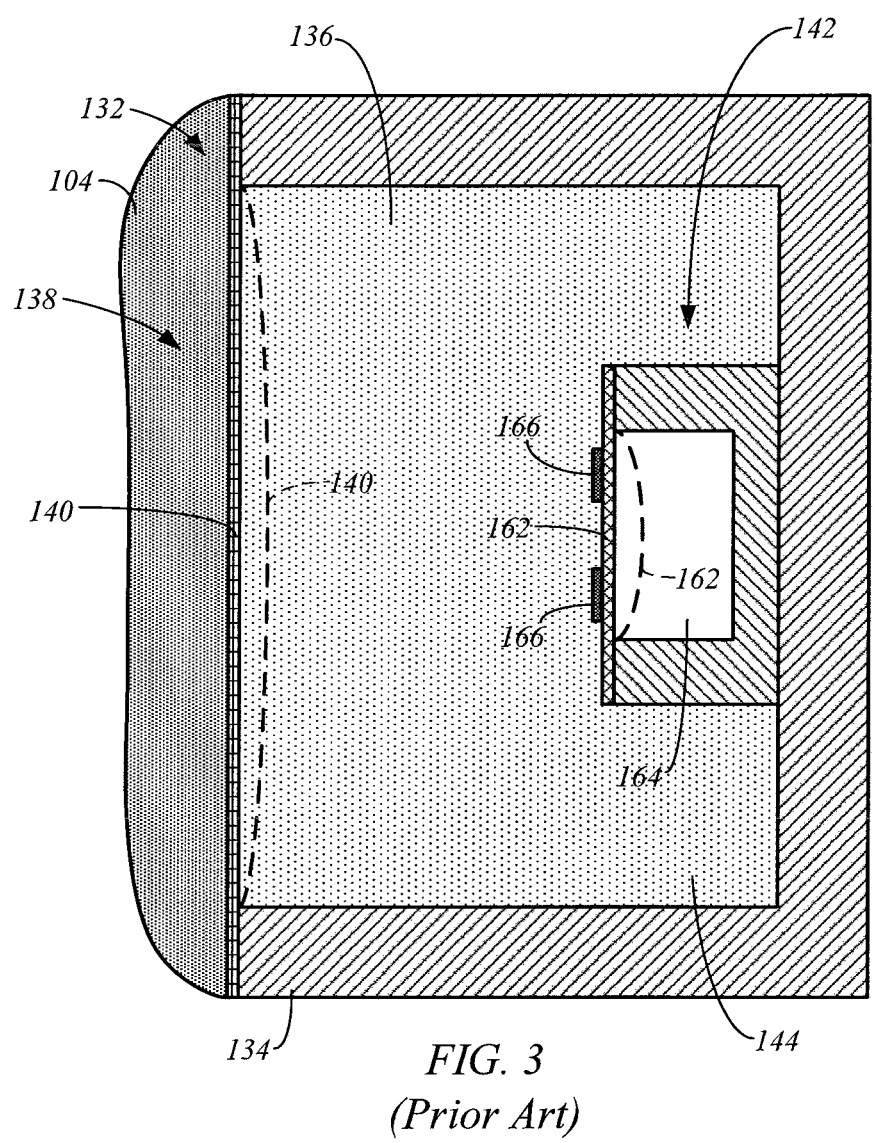
FIG. 3 is a simplified diagram of an exemplary pressure sensor and isolation arrangement, in accordance with the prior art.

The pressure sensor 142 may take on any suitable form. FIG. 3 is a simplified diagram of an exemplary pressure sensor 142 and isolation arrangement 132 in accordance with the prior art. In some embodiments, the pressure sensor 142 may include a pressure sensing diaphragm 162 that seals a reference pressure cavity 164 having a reference pressure. For an absolute pressure sensor, the reference pressure is a vacuum, for a gauge pressure sensor the reference pressure is at atmospheric pressure, and for a differential pressure sensor the reference pressure is another selected pressure, such as a different pressure of the process being monitored, for example.

The pressure sensing diaphragm 162 may be much stiffer than the isolation diaphragm 140. As a result, the pressure drop across the isolation diaphragm 140 may be very small compared to the pressure drop across pressure sensing diaphragm 162. As the hydrostatic pressure of the process medium 104 increases, the isolation diaphragm 140 deflects (dashed line) into the cavity 136 and the hydrostatic pressure of the fill fluid 144 within the cavity 136 increases causing the pressure sensing diaphragm 162 to deflect into the reference cavity 164. The amount of deflection of the pressure sensing diaphragm 162 (dashed line) may be measured by deflection gauges 166 that are attached to the pressure sensing diaphragm 162. The gauges 166 generate the pressure signal 146 (FIG. 2) that indicates the hydrostatic pressure of the process medium 104.

The volume swept by the deflection of the pressure sensing diaphragm 162 is filled with the fill fluid 144, so a similar volume of fill fluid is swept by the deflection of the isolation diaphragm 140. In practice, the isolation diaphragm 140 may sweep a slightly greater volume than the pressure sensing diaphragm 162 due to an expansion of the isolation cavity 136 and compression of the fill fluid 144.

The deflected positions of the diaphragms 162 and 140 (dashed lines) in response to the pressure of the process medium 104 are, thus, coupled together. That is, both diaphragms 162 and 140 deflect in proportion to the pressure applied by the process medium 104.

Over time, the isolation diaphragm 140 may become damaged to the point of developing a hole or crack resulting in a loss of the seal of the isolation cavity 136. This may occur due to corrosive or abrasive process media 104, physical damage from the process media 104, such as particles in the process media, or other mechanical interference. Initially, the impact of a rupture of the isolation diaphragm 140 may be very subtle. Instead of transferring the process pressure across the isolation diaphragm 140, the pressure is transferred directly to the pressure sensor 142 through the fill fluid 144. Thus, the pressure drop across the previously sealed isolation diaphragm 140 goes to zero due to the rupture. As discussed above, the lost pressure drop may be a very small positive or negative pressure compared to the pressure of the process medium 104. As a result, while the small increase or decrease in the pressure sensed by the process sensor 142 caused by the loss of the pressure drop across the diaphragm 140 may affect the accuracy of the pressure measurement, it may not be a sufficient trigger for a warning that the seal of the isolation cavity 136 has been breached.

When the process medium 104 is a liquid, it will eventually replace the fill fluid 144 over time. In the case of a gas or vapor process medium 104, the fill fluid 144 will gradually drain from the isolation cavity 136. In either case, the pressure sensor 142 becomes exposed to the process medium 104, which may cause damage to the pressure sensor 142 and/or degradation of the sensor signal 146.

Some pressure sensors 142 have impedance levels that make them very sensitive to galvanic leakage. If the process medium 104 (liquid or gas) creates such a leakage into the isolation cavity 136, such high impedance level pressure sensors will likely produce compromised pressure signals 146. For example, salt water is electrically conductive and will destroy the ability of a pressure sensor 142 having exposed high impedance nodes to produce an accurate pressure signal 146.

Embodiments of the present disclosure operate as a diagnostic tool for detecting a breach of the seal of the isolation cavity 136, such as a breach of the seal formed by the isolation diaphragm 140, for example. This allows for early notification of possible pressure measurement degradation and the need for servicing of the industrial process pressure sensing device 130.

Figure 4:
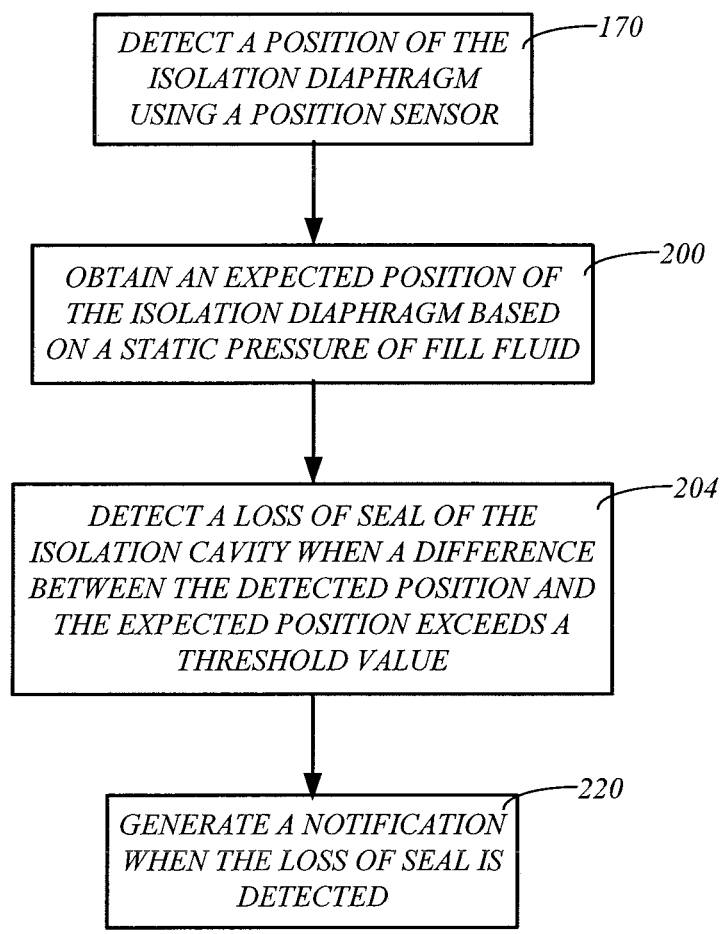
FIG. 4 is a flowchart illustrating an exemplary method for detecting a loss of a seal of an isolation cavity, in accordance with embodiments of the present disclosure.

FIG. 4 is a flowchart illustrating an exemplary method for detecting a loss of the seal of the isolation cavity, in accordance with embodiments of the present disclosure. At step 170 of the method, a position of the isolation diaphragm 140 is detected using a position sensor 172 (FIG. 2). In some embodiments, the position sensor 172 detects a position of the isolation diaphragm 140 relative to a reference, such as the housing 134, and generates a position signal 174 that is indicative of the position of the diaphragm 140 relative to the housing 134. Alternatively, a mechanical architecture may be used, in which the position sensor 172 is not leveled with the housing 134 or the cavity 136, but is imbedded further into the housing 134 or cavity 136. As used herein, the detected position of the diaphragm 140 corresponds to a position of a portion of the diaphragm 140, such as a central portion of the diaphragm 140, for example. The detected position of the diaphragm 140 may be determined by the controller 150 based on the position signal 174, and used as an indication of the condition of the seal of the isolation cavity 136.

In some embodiments, the position sensor 172 is displaced from the isolation diaphragm 140, as shown in FIG. 2. That is, the position sensor 172 does not contact the isolation diaphragm 140. In some embodiments, this displacement of the position sensor 172 from the isolation diaphragm 140 results in a portion of the isolation cavity 136 extending between the isolation diaphragm 140 and the position sensor 172, as shown in FIG. 2. In some embodiments, the gap between the position sensor and the isolation diaphragm is about 4-20 mils.

The position sensor 172 may take on any suitable form. In one embodiment, the position sensor 172 comprises an optical displacement sensor that measures a time of flight for electromagnetic radiation 176 discharged from an emitter 178 to reflect from the isolation diaphragm 140 and be received by a receiver 180 of the sensor 172, as illustrated schematically in FIG. 2. Alternatively, the position sensor 172 may comprise a capacitance displacement sensor that detects a capacitance between the isolation diaphragm 140 and an electrode 182 that is electrically insulated from the isolation diaphragm 140, as schematically shown in FIG. 2. The position sensor 172 may also comprise a surface acoustic wave (SAW) sensor that is mounted to the isolation diaphragm 140 and has an output that changes in response to flexing of the diaphragm 140. The SAW sensor could be interrogated remotely from a position on the housing 134. One embodiment of the position sensor 172 may comprise an acoustic sensor that uses a time of flight of an acoustic signal between a transmitter and receiver to detect the position of the isolation diaphragm 140 relative to the housing 134. Another exemplary position sensor 172 may include a thermal conductivity sensor that senses a thermal conductivity between two points of the housing 134 that changes with the position of the isolation diaphragm 140 relative to the housing 134.

Figure 5:
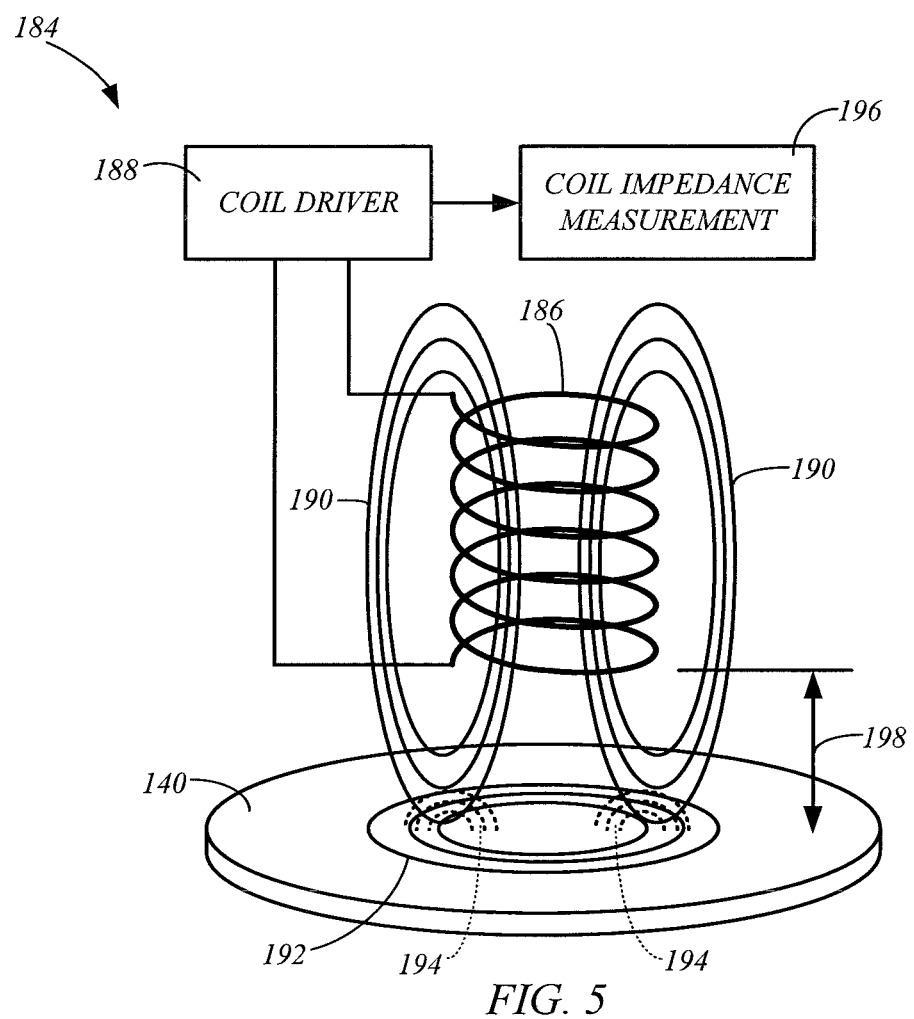
FIG. 5 is a simplified diagram of an exemplary eddy current displacement sensor, in accordance with embodiments of the present disclosure.

One embodiment of the position sensor 172 comprises an eddy current displacement sensor 184, an example of which is shown in the simplified diagram of FIG. 5. Note that the housing 134 and other components are not shown in FIG. 5 to simplify the drawing. The sensor 184 includes a coil 186 supported in a reference position relative to the isolation diaphragm 140, and a coil driver 188. In one embodiment, the reference position of the coil 186 is fixed to the housing 134. The coil driver 188 is configured to drive an alternating current through the coil 186 to produce an alternating current magnetic field 190. The isolation diaphragm 140, which is formed of metal, is in close proximity to the coil 186 so that it is exposed to the magnetic field 190. The magnetic field 190 induces eddy currents 192 in the isolation diaphragm 140, which in turn create magnetic fields 194 (dashed lines) that oppose the incident magnetic field 190. The magnitude of the eddy currents 192 and the impedance of the coil varies with the position of the isolation diaphragm 140 relative to the coil 186. Thus, the position of the isolation diaphragm 140 (e.g., central portion of the isolation diaphragm) relative to the housing 134 (FIG. 2) may be inferred by the impedance of the coil. As the isolation diaphragm moves closer to the coil, the impedance of the coil decreases, and as the isolation diaphragm moves away from the coil, the impedance of the coil increases. Accordingly, a measurement of the impedance of the coil 186 may be used as the position signal 174.

The coil 186 of the eddy current displacement sensor 184 may have a diameter that is at least twice the gap 198 between the coil 186 and the isolation diaphragm 140. In some embodiments, the gap varies with movement of the isolation diaphragm over a range of approximately 4-20 mils. Thus, in some embodiments, the coil has a diameter of at least 40 mils.

At 200 of the method, an expected position of the isolation diaphragm 140 relative to the housing 134 is obtained by the controller 150 based on the static pressure of the fill fluid 144 contained in the isolation cavity 136 detected by the pressure sensor 142 and indicated by the pressure signal 146. As discussed below, when the pressure sensor 142 is in the form of a differential pressure sensor, the static or line pressure may be obtained using a dedicated static pressure sensor, for example. In some embodiments, the controller 150 uses the static pressure of the fill fluid as an index to the expected position data 202 stored in the memory 152 to obtain the expected position of the isolation diaphragm 140 relative to the housing 134, and complete step 200 of the method.

The expected position of the isolation diaphragm 140 during normal operation when the isolation cavity 136 is properly sealed may be empirically determined. For example, the estimated or expected position of the isolation diaphragm 140 relative to the housing 134 over a range of pressures of the isolation fluid 144 may be determined through measurements of the isolation diaphragm position over a range of pressures of the isolation fluid 144 of the isolation arrangement 132, or a similar isolation arrangement. The resultant expected position data 202 may be defined by an algorithm, such as a polynomial, to compute the expected position of the isolation diaphragm 140 relative to the housing 134 based on the static pressure of the isolation fluid. Such a polynomial may also account for temperature and differential pressure (if applicable). Alternatively, a look-up table or another suitable data storage index may be used, that links the static pressure of the isolation fluid 144 within the cavity 136, and possibly a differential pressure (if applicable) and temperature, to the measured deflection or position.

The expected position of the isolation diaphragm 140 for a given pressure of the isolation fluid 144 may be based on additional environmental factors, such as temperature. Fill fluids 144, such as silicone oil, generally have a positive coefficient of thermal expansion. The expansion of the fill fluid may dominate other thermal expansions so that isolation diaphragm 140 position tends to deflect away from the pressure sensor 142 as the isolation arrangement 132 is heated. This influence may be determined during the empirical analysis of the isolation arrangement 132 by measuring the position of the isolation diaphragm 140 relative to the housing 134 over a range of static pressures of the fill fluid 144 and a range temperatures at each pressure. This results in expected position data 202 that indexes the position of the diaphragm 140 to a pressure and a temperature of the fill fluid 144. Thus, in some embodiments of step 200, the controller 150 uses the temperature signal 158 output by the temperature sensor 160 and the static pressure indicated by the pressure signal 146 to estimate the temperature of the fill fluid 144 and obtain the expected position of the isolation diaphragm 140 relative to the housing 134 using the expected position data 202.

At 204 of the method, the controller 150 detects a loss of seal of the isolation cavity 136 when a difference (absolute value) between the detected position (step 170) and the expected position (step 200) exceeds a threshold value 206, which may be retrieved from the memory 152, as indicated in FIG. 2. The threshold value 206 may be set empirically for a given pressure of the fill fluid 144 or combination of pressure and temperature of the fill fluid 144. Additionally, different threshold values may be indexed over a range of pressures or combination of pressures and temperatures for the fill fluid 144. A breach of the seal of the isolation cavity 136 is indicated when the difference between the expected and detected positions of the isolation diaphragm 140 relative to the housing 134 exceed the threshold value 206.

Figure 6:
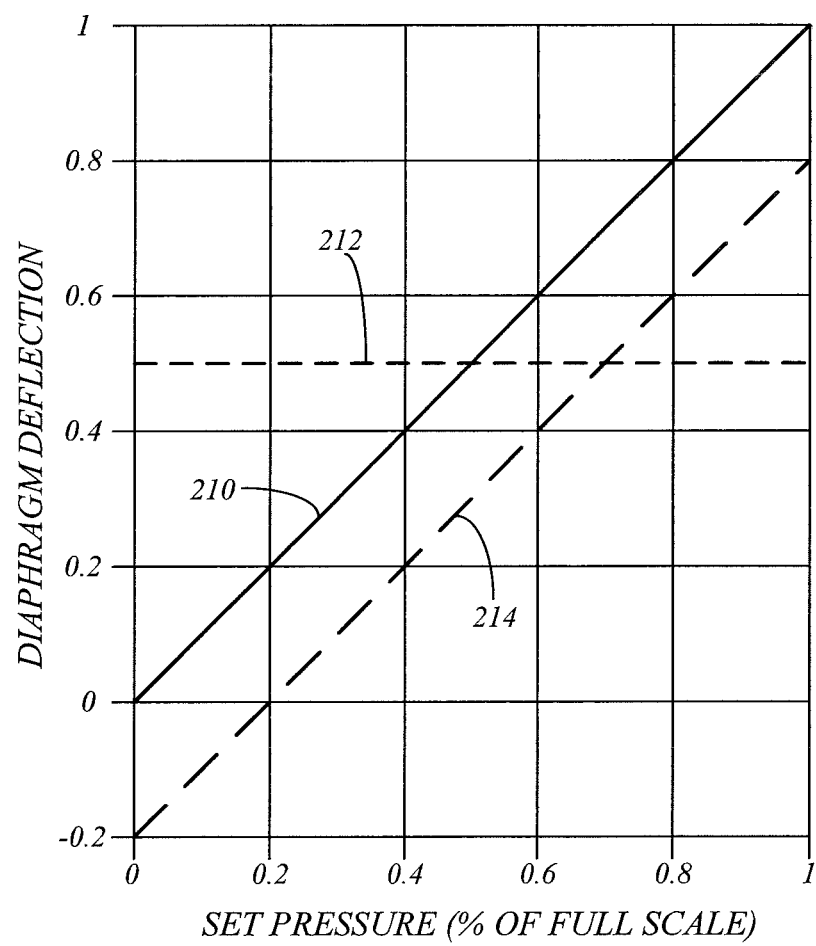
FIG. 6 is a diagram illustrating isolation diaphragm deflection over a range of static fluid fill pressures with sealed and unsealed isolation cavity conditions.

FIG. 6 is a diagram illustrating deflection of the isolation diaphragm 140 over a range of static pressures of the fill fluid 144 with sealed and unsealed isolation cavity conditions. The vertical scale is normalized to the deflection range of the isolation diaphragm 140. The solid line 210 represents the deflection of the isolation diaphragm 140 for a properly sealed isolation cavity 136 and corresponds to the expected deflection or position of the diaphragm 140 defined by the expected position data 202.

The dashed line 212 represents the deflection of a ruptured isolation diaphragm 140. Here, the isolation diaphragm 140 moves to a neutral position, which is shown as being at 0.5, but could be a different value. The position of the isolation diaphragm 140 is independent of the pressure of the fill fluid 144, so it will deviate from the expected position for a given pressure and/or pressure and temperature of the fill fluid 144, except where the position line 212 intersects the position line 210 for normal operation. Accordingly, for a vast majority of the pressure range, the ruptured isolation diaphragm 140 is detectable in step 204 of the method, due to the difference between the expected position and the detected position being greater than the threshold value 206.

The dashed line 214 of FIG. 6 represents a partial loss of the fill fluid 144 from the isolation cavity 136 due to a leak. Here, the isolation diaphragm 140 still responds to pressure changes of the process medium 104, however the measured position of the isolation diaphragm (line 214) will be offset from the expected position (line 210) due to the partial loss of the fill fluid 144. After a sufficient amount of the fill fluid 144 has leaked from the isolation cavity 136, the difference between the measured and expected positions of the isolation diaphragm 140 will exceed the corresponding threshold value 206, and the controller 150 will detect the fault in step 204 of the method.

In some embodiments of the method, the controller 150 is configured to generate a notification of the loss of seal condition of the cavity 136 detected in step 204, as indicated at 220 of the method. The notification may take on any suitable form. In some embodiments, the notification comprises an alarm including a visible alarm and/or an audible alarm issued by a suitable output device 222 (e.g., strobe, LED, speaker, etc.) of the device 130, which is shown in FIG. 2. Some embodiments of the notification include a communication of notification information 224 to an external computing device, such as the control unit 114. The notification 224 may include information regarding the type of breach of the isolation cavity seal that has occurred. For example, the notification 224 may indicate that the isolation diaphragm 140 has ruptured or that the isolation cavity 136 has a leak, based on the measured position of the isolation diaphragm 140 relative to its expected position, such as using information that distinguishes these conditions, such as that presented in FIG. 6.

Figure 7:
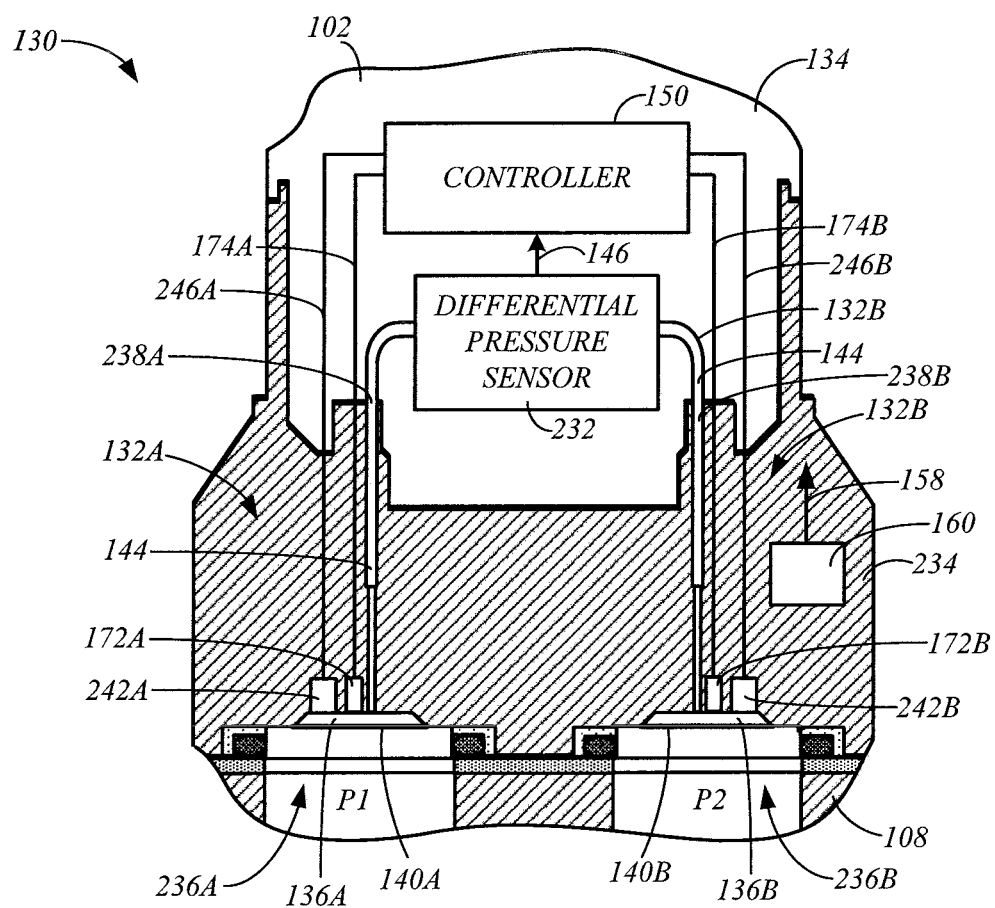
FIG. 7 is a simplified cross-sectional view of a portion of an exemplary industrial process differential pressure sensing device, in accordance with embodiments of the present disclosure.

FIG. 7 is a simplified cross-sectional view of a portion of an exemplary industrial process differential pressure sensing device 130, in accordance with embodiments of the present disclosure. The illustrated device 130 may comprise the differential pressure transmitter 102 mounted to the adapter 108 (FIG. 1). The transmitter 102 may include a housing 134 that encloses and protects electronics of the transmitter 102 from environmental conditions, and a differential pressure sensor 232. The housing 134 includes a base 234 that may include one or more process openings 236, such as process openings 236A and 236B. The process openings 236 may be coupled to the process medium 104 through suitable connections, such as through the adapter 108, the manifold 110, and/or process interface 112, as shown in FIG. 1.

The exemplary transmitter 102 essentially includes two isolation arrangements 132A and 132B. The isolation arrangement 132A utilizes an isolation diaphragm 140A that is exposed to the process pressure P1 presented to the process opening 236A, and the isolation arrangement 132B utilizes an isolation diaphragm 140B that is exposed to the process pressure P2 presented to the process opening 236B. As discussed above, the isolation diaphragms 140A and 140B each flex in response to the pressures P1 and P2, which are communicated to the differential pressure sensor 232 through corresponding isolation cavities 136A and 136B comprising lines 238A and 238B, which are filled with an isolation fluid 144.

The differential pressure sensor 232 generates a differential pressure signal 146 in response to the difference between the pressures P1 and P2. The differential pressure signal 146 may be delivered to the controller 150 through lead wires or another suitable connection, and the controller 150 may be used to communicate the differential pressure measurement indicated by the signal 146 to the control unit 114 using any suitable technique.

Figure 8:
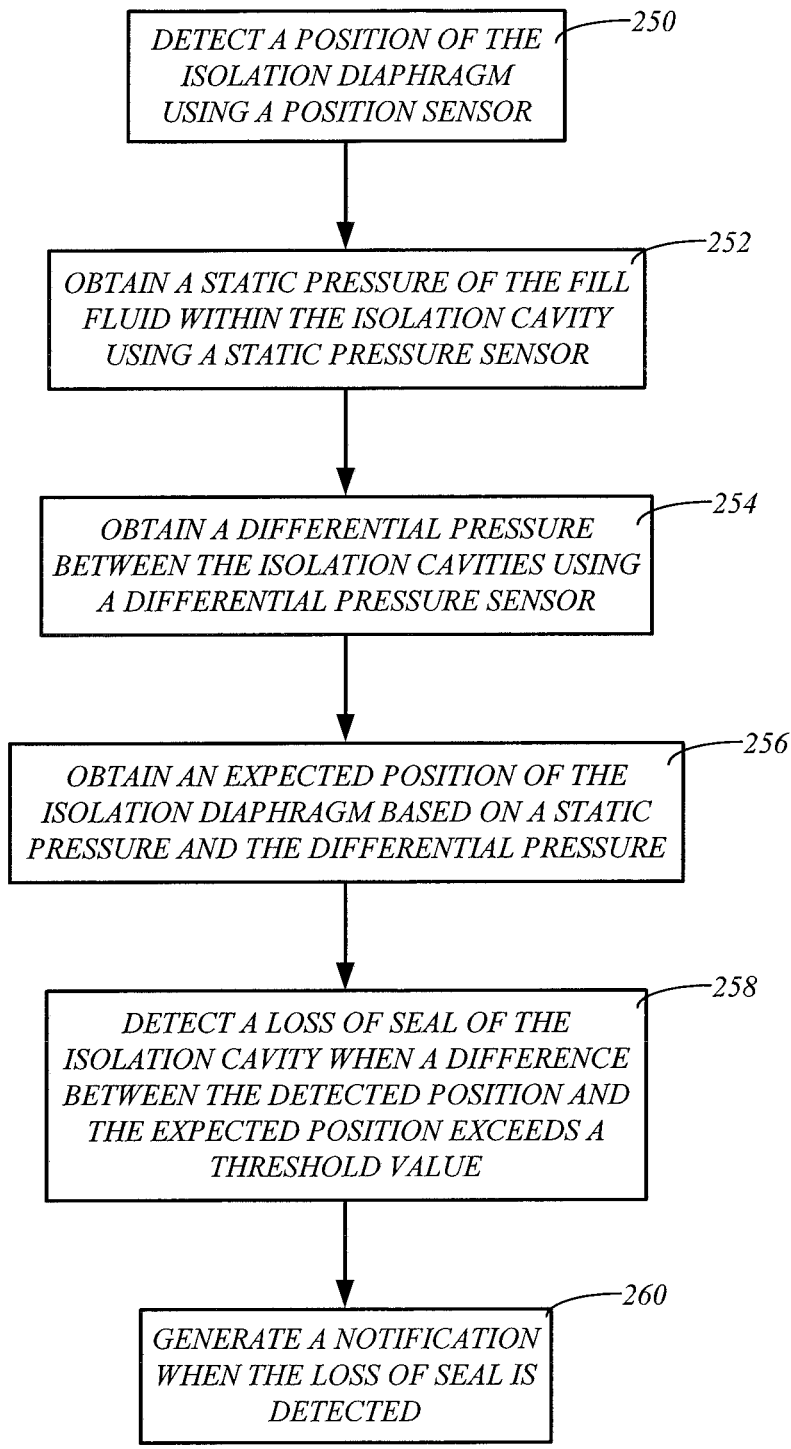
FIG. 8 is a flowchart illustrating an exemplary method of detecting a loss of seal of an isolation cavity in an industrial process differential pressure sensing device, in accordance with embodiments of the present disclosure.

Some embodiments of the present disclosure operate to detect a loss of seal condition of the isolation cavity 136A of the isolation arrangement 132A and/or the isolation cavity 136B of the isolation arrangement 132B. FIG. 8 is a flowchart of a method of detecting such a loss of a seal, in accordance with embodiments of the present disclosure.

In some embodiments, the isolation arrangement 132A includes a position sensor 172A, and/or the isolation arrangement 132B includes a position sensor 172B. In one embodiment, the position sensors 172A and 172B are eddy current displacement sensors, such as that discussed above with reference to FIG. 5.

At 250 of the method, a position of the isolation diaphragm 140A relative to the housing 134 is detected using the position sensor 172A, such as described above with regard to step 170 of the method of FIG. 4. The position sensor 172A outputs a position signal 174A to the controller 150 that is indicative of the sensed position of the isolation diaphragm 140A. In some embodiments, a position of the diaphragm 140B relative to the housing 134 is detected using the position sensor 172B, which outputs a position signal 174B to the controller 150 that is indicative of the detected position.

The device 130 includes at least one static or line pressure sensor 242, such as static pressure sensors 242A or 242B, which are respectively configured to measure the static pressure of the fill fluid 144 in the isolation cavities 136A and 136B, and generate static pressure signals 246A and 246B indicating the measured pressures. Only one of the static pressure sensors 242A or 242B may be necessary to establish the static pressures in both cavities 136A and 136B when the differential pressure between the cavities 136A and 136B is known. For example, when the differential pressure (DP=P1−P2) and the static pressure P1 are known, the static pressure P2 may be calculated by subtracting the differential pressure from the pressure P1. For some industrial process applications, the static pressure may be quite extreme and range from zero to several thousand pounds per square inch (psi). Some industrial process differential pressure sensing devices are rated to withstand static pressures up to 15,000 psi (same as 1034 Bar or 103 MPa).

At 252 of the method, the controller 150 obtains a static pressure of the fill fluid within the isolation cavities 136A and 136B is obtained using a static pressure sensor, such as sensor 242A or 242B. The controller 150 also obtains a differential pressure between the isolation cavities 136A and 136B using the differential pressure sensor 232, at 254 of the method. For example, the controller 150 may receive a signal 146 that is indicative of the differential pressure between the cavities 136A and 136B.

At 256 of the method, the controller 150 obtains an expected position for the isolation diaphragm 140A based on the obtained static and differential pressures. The controller 150 may also obtain an expected position of the isolation diaphragm 140B based on the obtained static and differential pressures. Additionally, as discussed above, the expected positions for the isolation diaphragms 140A and 140B may further be based on a temperature signal 158 output from the temperature sensor 160.

At 258 of the method, the controller 150 detects a loss of seal condition of the isolation cavity 136A when the difference between the measured and expected positions of the isolation diaphragm 140A exceed a corresponding threshold 206 (FIG. 2). Likewise, the controller 150 can detect a loss of seal condition of the isolation cavity 136B when the difference between the measured and expected positions of the isolation diaphragm 140B exceed a corresponding threshold 206.

When a loss of seal condition is detected, the controller 150 may generate a notification at 260 of the method, such as described above with regard to step 220 of the method of FIG. 4. In addition to the information mentioned above, some embodiments of the notification include information that identifies the isolation arrangement 132A or 132B or the corresponding isolation cavity 136A or 136B whose seal has been breached.

The effects on the change in position of the isolation diaphragms 140A and 140B due to the differential pressure between the cavities 136A and 136B measured by the sensor 232, the temperature of the fill fluid 144 measured by the temperature sensor 160, and the static pressure of the fill fluid 144 measured by the static pressure sensor 242A or 242B, may be determined for a particular differential pressure sensing device using empirical techniques. For example, the position of the diaphragm 140A on the high pressure side P1 measured by the position sensor 172A may decrease and the position of the diaphragm 140B on the low pressure side P2 measured by the position sensor 172B may increase from a differential pressure of zero to the maximum differential pressure (e.g., about 9 psi). The positions of the isolation diaphragms 140A and 140B measured by the sensors 172A and 172B may increase as the fill fluid temperature measured by the sensor 160 increases. The positions of the diaphragms 140A and 140B measured by the sensors 172A and 172B may decrease over a static pressure range of 0 to 1000 psi. Thus, an accurate determination of the expected positions of the isolation diaphragm 140A or 140B in step 256 of the method, depends on the accurate prediction of the isolation diaphragm positions in the presence of these influences of the differential pressure, the temperature of the fill fluid 144, and the static pressure of the fill fluid 144 in the cavity 136A or 136B.

The effect the static pressure has on the compression of the fill fluid 144 and the position of the isolation diaphragms 140A or 140B may involve measuring the static pressure using the sensor 242A and/or 242B and using either empirically-derived family characteristics of a population of the pressure sensing devices 130 or an empirically-derived factory characterization of the pressure sensing device 130, to form a characterization (e.g., look-up table, polynomial, correction algorithm), from which a measured static pressure of the fill fluid 144 can be used to determine an expected change in position of the diaphragm 140A and/or 140B for a given differential pressure and/or temperature measurement. The controller 150 may use characterization to identify a position change of the diaphragm 140A and/or 140B based upon the static pressure detected by the sensor 242A or 242B, and take this position change into account when determining the expected positions of the diaphragms 140A or 140B in step 256 of the method.

The use of the family characteristics of the device 130 to establish the effects of the static pressure of the fill fluid on the position of the diaphragms 140A or 140B is generally preferred when the devices 130 perform substantially the same from unit to unit. The empirically established family characteristics for the population of devices 130 may be used in each of the devices 130 to account for the influence the static pressure of the fill fluid 144, and optionally, the temperature of the fill fluid 144, have on the expected position of the isolation diaphragms 140A and 140B. The advantage of the use of the family characteristics is that each individual device 130 is not required to be factory characterized, resulting in lower manufacturing cost.

The use of an empirically-derived factory characterization of the pressure sensing device 130 is preferably used when a population of the devices 130 have substantially dissimilar characteristic responses to the static pressure of the fill fluid 144. In this case, each device 130 is factory characterized for the influence of the static pressure of the fill fluid 144 on the position of the isolation diaphragms 140A and/or 140B. In some embodiments, this characterization is determined for each temperature in the characterization profile. This allows the controller 150 to account for the influence of the static pressure of the fill fluid 144 measured by the sensor 242A or 242B at all pressures and temperatures that the device 130 is likely to be subjected to. This process is more expensive than when the family characteristics are used because each device 130 must be analyzed to determine the effects of exposure to the static pressure and temperature conditions to form the look-up table for the device 130.

The characterization of a device 130 or a family of devices 130 may involve a characterization over a range of differential pressures, temperatures and static pressures that the device 130 is likely to be subjected to. For example, a characterization profile may be established using: 9 differential pressure (DP) points, such as [−100, −75, −50, −25, 0, 25, 25, 75, 100] percent of the upper range limit (URL); 5 temperature points [−40, −10, 25, 55, 85] degrees Celsius; and 3 static pressure or line pressure (LP) points [0, 1500, 3000] psi. Note that the negative percentages of the URL may operate to cover the lower range limit (LRL) of the device 130. For example, the URL of a device 130 may be 9 psi and the LRL of the device 130 may be −9 psi. Conditions of the device 130 are stabilized at each point, and the position of the diaphragms 140A and/or 140B are measured at each point, such as using the position sensors 172A and 172B. The position measurements may be recorded along with the corresponding differential pressure, temperature and static pressure raw data in a look-up table or mapping. A full set of points may include all of the differential pressure and temperature points combination, which, for the above example, results in 45 measurement points. Additionally, the full set of points may include the zero differential pressure and non-zero static pressure points at all temperatures, which, for the above example, results in 10 measurement points. Alternatively, the impact of the static pressure on the position of the diaphragm 140A and/or 140B may be determined for multiple differential pressures. Exemplary data representing the characterization of a device 130 or family of devices 130 having all 55 measurement points is provided below in Table 1.

TABLE 1

| Points | DP (% URL) | Temp (deg C.) | LP (PSI) |
|---|---|---|---|
| 1 | −100 | −40 | 0 |
| 2 | −75 | −40 | 0 |
| 3 | −50 | −40 | 0 |
| 4 | −25 | −40 | 0 |
| 5 | 0 | −40 | 0 |
| 6 | 0 | −40 | 1500 |
| 7 | 0 | −40 | 3000 |
| 8 | 25 | −40 | 0 |
| 9 | 50 | −40 | 0 |
| 10 | 75 | −40 | 0 |
| 11 | 100 | −40 | 0 |
| 12 | −100 | −10 | 0 |
| 13 | −75 | −10 | 0 |

TABLE 1-continued

| Points | DP (% URL) | Temp (deg C.) | LP (PSI) |
|---|---|---|---|
| 14 | −50 | −10 | 0 |
| 15 | −25 | −10 | 0 |
| 16 | 0 | −10 | 0 |
| 17 | 0 | −10 | 1500 |
| 18 | 0 | −10 | 3000 |
| 19 | 25 | −10 | 0 |
| 20 | 50 | −10 | 0 |
| 21 | 75 | −10 | 0 |
| 22 | 100 | −10 | 0 |
| 23 | −100 | 25 | 0 |
| 24 | −75 | 25 | 0 |
| 25 | −50 | 25 | 0 |
| 26 | −25 | 25 | 0 |
| 27 | 0 | 25 | 0 |
| 28 | 0 | 25 | 1500 |
| 29 | 0 | 25 | 3000 |
| 30 | 25 | 25 | 0 |
| 31 | 50 | 25 | 0 |
| 32 | 75 | 25 | 0 |
| 33 | 100 | 25 | 0 |
| 34 | −100 | 55 | 0 |
| 35 | −75 | 55 | 0 |
| 36 | −50 | 55 | 0 |
| 37 | −25 | 55 | 0 |
| 38 | 0 | 55 | 0 |
| 39 | 0 | 55 | 1500 |
| 40 | 0 | 55 | 3000 |
| 41 | 25 | 55 | 0 |
| 42 | 50 | 55 | 0 |
| 43 | 75 | 55 | 0 |
| 44 | 100 | 55 | 0 |
| 45 | −100 | 85 | 0 |
| 46 | −75 | 85 | 0 |
| 47 | −50 | 85 | 0 |
| 48 | −25 | 85 | 0 |
| 49 | 0 | 85 | 0 |
| 50 | 0 | 85 | 1500 |
| 51 | 0 | 85 | 3000 |
| 52 | 25 | 85 | 0 |
| 53 | 50 | 85 | 0 |
| 54 | 75 | 85 | 0 |
| 55 | 100 | 85 | 0 |

The collected characterization data may be used to form a look-up table or to calculate coefficients for correction algorithms that may be used by the controller 150 to estimate the expected position of the isolation diaphragms 140A and 140B. The correction algorithms may be based on multivariate polynomials, or lookup tables, or a combination of polynomials and lookup tables. Such correction algorithms use the coefficients to calculate a corrected differential pressure, a corrected temperature, a corrected static pressure, an estimated or expected position for the diaphragm 140A, and an estimated or expected position for the diaphragm 140B. The corrected differential pressure is the estimated differential pressure compensated for temperature and static pressure influences. A curve fitting process may use the differential pressure in the data table above as the independent variable. The corrected temperature may be an estimate of the fill fluid temperature compensated for differential pressure and static pressure, if necessary. A curve fitting process may use the test station temperature from the table above as the independent variable. The corrected static or line pressure may be an estimate of the static pressure that is compensated for temperature and differential pressure, if necessary. A curve fitting process may use the test station measured static pressure from the table above as the independent variable. The estimated or expected position of the diaphragm 140A may be calculated based on the corrected differential pressure, the corrected static pressure and the corrected temperature. A curve fitting process may use the measured position of the diaphragm 140A, such as by the position sensor 172A, from the characterization data in the table above as the independent variable. The estimated or expected position of the diaphragm 140B may be calculated based on the corrected differential pressure, the corrected static pressure and the corrected temperature. A curve fitting process may use the measured position of the diaphragm 140B, such as by the position sensor 172B, from the characterization data in the table above as the independent variable. The correction algorithms may also remove linearity errors from the native sensor signals generated by the pressure sensor 142, the differential pressure sensor 232, the temperature sensor 160 and the position sensor 172, using conventional techniques.I The coefficients for the correction algorithms may be stored in the memory 152 of the device 130, such as indicated at 230 in FIG. 2, and used by the controller 150 to determine the expected position of the diaphragms 140A and 140B in step 256 of the method. For example, the controller 150 may receive the differential pressure from the pressure sensor 232 (FIG. 7), the static pressure from the static pressure sensor 242A or 242B, the temperature from the temperature sensor 160, and the measured position of the diaphragm 140A and 140B from the sensors 172A and 172B. The controller 150 may then use the coefficients 230 (FIG. 2) in the correction algorithms to produce estimates for the corrected differential pressure, the corrected static or line pressure, the corrected temperature, and the expected positions for the isolation diaphragms 140A and 140B (step 256). The controller 150 may then compare the difference between the calculated expected positions of the isolation diaphragms 140A and 140B and the measured positions indicated by the position sensors 172A and 172B to a corresponding threshold 206 to detect a loss of seal of the isolation cavity 136A or 136B (method step 258). If a loss of seal is detected, a notification may be generated at step 260 of the method, as discussed above.

Although the embodiments of the present disclosure have been described with reference to preferred embodiments, workers skilled in the art will recognize that changes may be made in form and detail without departing from the spirit and scope of the present disclosure.

What is claimed is:

1. An industrial process differential pressure sensing device comprising:
   a housing including a first isolation cavity and a fill fluid contained in the first isolation cavity, and a second isolation cavity and a fill fluid contained in the second isolation cavity;
   a first isolation diaphragm configured to seal a process interface of the first isolation cavity from a process medium;
   a second isolation diaphragm configured to seal a process interface of the second isolation cavity from the process medium;
   a static pressure sensor configured to output a static pressure signal that is based on a pressure of the fill fluid in the first isolation cavity;
   a first eddy current displacement sensor configured to output a first position signal indicative of a position of the first isolation diaphragm relative to the housing;
   a differential pressure sensor exposed to sensor interfaces of the first and second isolation cavities and configured to output a differential pressure signal that is indicative of a difference in pressure between the fill fluids in the first and second isolation cavities; and a controller configured to detect a loss of a seal of the first isolation cavity based on the first position signal, the static pressure signal and the differential pressure signal.

2. The device of claim 1, wherein:
the first eddy current displacement sensor is displaced from the first isolation diaphragm; and
the first isolation cavity extends between the first eddy current displacement sensor and the first isolation diaphragm.

3. The device of claim 1, wherein the controller is configured to:
obtain an expected position of the first isolation diaphragm relative to the housing based on the static pressure and the differential pressure;
determine a first difference between the position indicated by the first position signal and the expected position of the first isolation diaphragm; and
detect the loss of seal of the first isolation cavity when the first difference exceeds a first threshold value.

4. The device of claim 3, wherein:
the first eddy current displacement sensor comprises a coil supported by the housing and configured to induce an eddy current in the first isolation diaphragm; and
the position signal is based on an impedance of the coil.

5. The device of claim 4, wherein:
the device includes a temperature sensor having a temperature signal that is indicative of a temperature of the fill fluid contained in the first isolation cavity; and
the controller is configured to detect the loss of the seal of the first isolation cavity based on the temperature signal.

6. The device of claim 3, further comprising a second eddy current displacement sensor configured to output a second position signal indicative of a position of the second isolation diaphragm relative to the housing, wherein the controller is configured to detect a loss of a seal of the second isolation cavity based on the second position signal, the static pressure signal and the differential pressure signal.

7. The device of claim 6, wherein the controller is configured to:
obtain an expected position of the second isolation diaphragm relative to the housing based on the static pressure and the differential pressure;
determine a second difference between the position indicated by the second position signal and the expected position of the second isolation diaphragm; and
detect the loss of seal of the second isolation cavity when the second difference exceeds a second threshold value.

8. The device of claim 7, wherein:
the first eddy current displacement sensor comprises a first coil supported by the housing and configured to induce an eddy current in the first isolation diaphragm;
the position signal output from the first position sensor is based on an impedance of the first coil;
the second eddy current displacement sensor comprises a second coil supported by the housing and configured to induce an eddy current in the second isolation diaphragm; and
the position signal output from the second position sensor is based on an impedance of the second coil.

9. The device of claim 8, wherein:
the device includes a temperature sensor having a temperature signal that is indicative of a temperature of the fill fluid contained in the first and second isolation cavities; and
the controller is configured to detect the loss of the seal of the first isolation cavity and the loss of seal of the second isolation cavity based on the temperature signal.

10. The device of claim 1, wherein the controller configured to detect the loss of the seal of the first isolation cavity based a characterization that corelates the static pressure to a change in position of the first isolation diaphragm.

11. A method of detecting a loss of a seal of an isolation cavity of an isolation arrangement in an industrial process differential pressure sensing device, which includes a housing having first and second isolation cavities, a differential pressure sensor, a static pressure sensor, a first isolation diaphragm sealing a process interface of the first isolation cavity from an industrial process medium, and a second isolation diaphragm sealing a process interface of the second isolation cavity from the process medium, the method comprising:
detecting a position of the first isolation diaphragm relative to the housing using a first eddy current displacement sensor;
obtaining a static pressure of the fill fluid within the first isolation cavity using the static pressure sensor;
obtaining a differential pressure between the first and second isolation cavities using the differential pressure sensor;
obtaining an expected position of the first isolation diaphragm relative to the housing from memory based on the static pressure and the differential pressure using a controller;
detecting a loss of seal of the first isolation cavity when a difference between the detected position of the first isolation diaphragm and the expected position of the first isolation diaphragm exceeds a threshold value using the controller; and
generating a notification when the loss of seal is detected using the controller.

12. The method of claim 11, wherein:
the method includes detecting a temperature of the fill fluid within the first isolation cavity using a temperature sensor; and
obtaining the expected position of the first isolation diaphragm relative to the housing is based on the temperature.

13. The method of claim 12, wherein:
the eddy current displacement sensor is displaced from the first isolation diaphragm; and
the first isolation cavity extends between the first eddy displacement sensor and the first isolation diaphragm.

14. The method of claim 13, wherein the first eddy current displacement sensor comprises a coil supported by the housing and configured to induce an eddy current in the first isolation diaphragm.

15. The method of claim 11, further comprising:
detecting a position of the second isolation diaphragm relative to the housing using a second eddy current displacement sensor;
obtaining an expected position of the second isolation diaphragm relative to the housing from memory based on the static pressure and the differential pressure using a controller;
detecting a loss of seal of the second isolation cavity when a difference between the detected position of the second isolation diaphragm and the expected position of the second isolation diaphragm exceeds a threshold value using the controller; and
generating a notification when the loss of seal of the second isolation cavity is detected using the controller.

16. The method of claim 15, wherein:

the method includes detecting a temperature of the fill fluid within the first and second isolation cavities using a temperature sensor;

obtaining the expected position of the first isolation diaphragm relative to the housing is based on the temperature; and obtaining the expected position of the second isolation diaphragm relative to the housing is based on the temperature.

17. The method of claim 16, wherein:

the first eddy current displacement sensor is displaced from the first isolation diaphragm;

the first isolation cavity extends between the first eddy displacement sensor and the first isolation diaphragm;

the second eddy current displacement sensor is displaced from the second isolation diaphragm; and the second isolation cavity extends between the second eddy displacement sensor and the second isolation diaphragm.

18. The method of claim 17, wherein:

the first eddy current displacement sensor comprises a coil supported by the housing and configured to induce an eddy current in the first isolation diaphragm; and the second eddy current displacement sensor comprises a coil supported by the housing and configured to induce an eddy current in the second isolation diaphragm.

19. The method of claim 11, wherein obtaining an expected position of the first isolation diaphragm is based on a characterization that corelates the static pressure to a change in position of the first isolation diaphragm.

* * * * *